L. S. LACHMAN.
WELDED TUBING.
APPLICATION FILED JUNE 14, 1913.
1,108,191.  Patented Aug. 25, 1914.
Fig. 1.
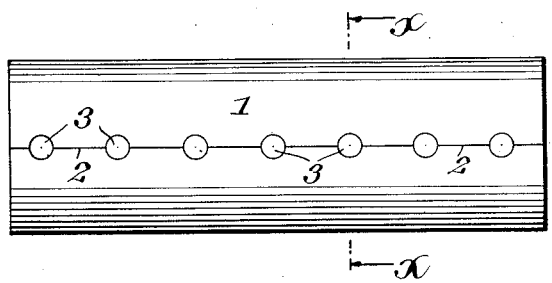
Fig. 2.
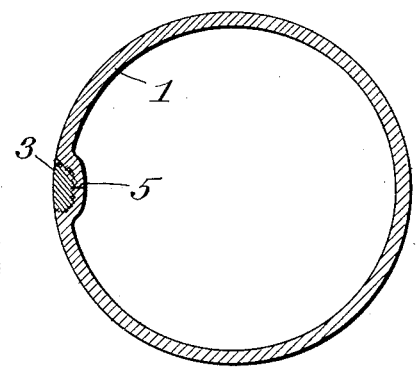
Fig. 3.
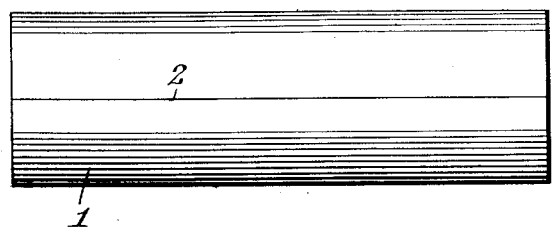
Fig. 4.
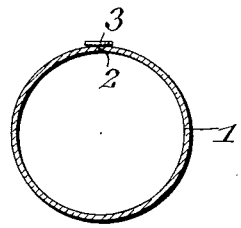
Fig. 5.
WITNESSES
INVENTOR
Laurence S. Lachman.
BY
ATTORNEYS

UNITED STATES PATENT OFFICE.

LAURENCE S. LACHMAN, OF NEW YORK, N. Y., ASSIGNOR TO UNIVERSAL ELECTRIC WELDING COMPANY, OF NEW YORK, N. Y., A CORPORATION OF NEW YORK.

WELDED TUBING.

1,108,191.      Specification of Letters Patent.      Patented Aug. 25, 1914.

Application filed June 14, 1913. Serial No. 773,655.

*To all whom it may concern:*

Be it known that I, LAURENCE S. LACHMAN, a citizen of the United States, and a resident of New York, in the county of New York and State of New York, have invented certain new and useful Improvements in Welded Tubing, of which the following is a specification.

My invention relates to the construction of metal tubing.

The object is to provide a novel construction of tubing that will be substantially as strong as the previous constructions having a continuously welded or brazed longitudinal seam and that will have substantially as good a finish as tubing in which the longitudinal joint is composed of the abutted edges of the metal skelp or blank and which at the same time is capable of being readily and cheaply constructed.

To these ends my invention consists in the novel construction of tubing hereinafter described and more particularly specified in the claims.

Figure 1 is a plan of a section of metal tubing embodying my invention. Fig. 2 is a cross-section through the same on the line X—X. Fig. 3 is a plan of a section of the stock from which my improved tubing is constructed. Fig. 4 is a cross-section through the stock on a line coinciding with the center of one of the buttons, showing said button applied to the stock preparatory to the welding operation to produce the finished tubing of the construction shown in Figs. 1 and 2. Fig. 5 is a plan of one of the buttons.

1 indicates the body of the tubing and 2 represents the longitudinal joint made by the closely abutted edges of the skelp when formed up in a suitable machine.

3 indicates a series of buttons or pieces of metal welded across the edges of the longitudinal seam or joint as bridges and sunk in the material of the tubing so as to be substantially flush with the surface thereof as indicated in the cross-section Fig. 2. These welded buttons or pieces may be welded across the joint by the well known electric welding process, in which case the buttons, one of which is indicated in plan in Fig. 5 and in side view in Fig. 4, are applied one at a time upon the surface of the piece of stock and so as to lap the abutted edges forming the longitudinal joint and are then subjected to electrical heating and pressure in any suitable electric welding machine. This operation may be conducted either with or without an internal mandrel to support the work beneath the point of application of the button. When conducted without any internal mandrel the pressure of the welding electrode upon the button will sink the button in the material of the tube, causing at the same time a slight bulge on the inner surface, as indicated in the cross-section Fig. 2. When the operation is conducted in this manner, which is feasible, however, only when the stock is of considerable stiffness, the tube is supported entirely by an external support forming preferably one electrode of the welding machine and the opposite electrode applies the heating current and welding pressure directly to the button. The operation, however, can be conducted, though not so conveniently, by the use of an internal electrode supporting the stock immediately beneath the point of application of the button, in which case the pressure will consolidate or condense the button and a less or no projection will exist on the inside of the tubing, although, as before, the bridging button will be practically sunk in the material of the tubing so as to be practically flush with the surface of the stock and so as to present substantially the appearance shown in the drawings. In some cases, however, a slight bur may exist around the edge of the sunken button, which is preferably ground off. Inasmuch as the electric welding process employed in a manner above indicated is a well known process and the shapes of electrodes employed will readily occur to those skilled in the art of welding, I have not described the same more in detail.

When the operation of constructing the tubing is conducted in the manner already explained without any support beneath the button and within the tubing, the pressure exerted by the welding electrode practically results in counter-sinking the button in the material, the bulge as shown in the cross-section comprising substantially the displaced material of the tubular stock used. This is indicated by the presence of the slight line of division 5, as shown in the cross-section Fig. 2, which coincides with the line of division at the abutted edges of the stock itself, said stock beneath the button being depressed by the operation so as to project slightly into the bore of the tubing.

It is obvious that the shape of the button is a matter of choice and that any other configuration besides a round shape might be employed without departing from the invention.

What I claim as my invention is:

1. Metal tubing having the meeting or abutting edges of the longitudinal joint united at intervals by buttons welded across the edges and sunk in the material of the tubing.

2. Metal tubing having the meeting or abutting edges of its longitudinal joint united at intervals by bridging pieces welded across the edges and flush with the surface of the tubing.

Signed at New York in the county of New York and State of New York this 4th day of June A. D. 1913.

LAURENCE S. LACHMAN.

Witnesses:
 HOWARD HIPKINS,
 C. T. TISCHNER, Jr.